United States Patent [19]

Park

[11] Patent Number: 5,764,242
[45] Date of Patent: Jun. 9, 1998

[54] VIDEO OVERLAY IMAGE CONVERTER

[75] Inventor: Kyun-Hoe Park, Suwon, Rep. of Korea

[73] Assignee: Samsung Electronics, Co., Ltd., Kyonggi-Ko, Rep. of Korea

[21] Appl. No.: 498,241

[22] Filed: Jul. 5, 1995

[30] Foreign Application Priority Data

Jul. 5, 1994 [KR] Rep. of Korea .............. 1994-15992

[51] Int. Cl.$^6$ .................................................. G06T 1/00
[52] U.S. Cl. ...................... 345/501; 345/113; 345/435; 345/507; 345/515; 345/526
[58] Field of Search ..................... 345/185, 113, 345/126, 121, 200, 190, 123, 150, 501, 526, 515, 507, 509, 517; 371/21.2; 348/578, 583; 395/800, 135

[56] References Cited

U.S. PATENT DOCUMENTS

| | | | |
|---|---|---|---|
| 4,776,026 | 10/1988 | Ueyama | 345/126 |
| 4,806,920 | 2/1989 | Sawada | 345/126 |
| 4,952,920 | 8/1990 | Hayashi | 345/126 |
| 4,954,970 | 9/1990 | Walker et al. | 345/113 |
| 5,089,811 | 2/1992 | Leach | 345/113 |
| 5,206,833 | 4/1993 | Lee | 345/150 |
| 5,386,421 | 1/1995 | Ishikawa | 371/21.2 |
| 5,497,498 | 3/1996 | Taylor | 395/800 |

*Primary Examiner*—Kee M. Tung
*Attorney, Agent, or Firm*—Cushman Darby & Cushman IP Group of Pillsbury Madison & Sutro LLP

[57] ABSTRACT

A video overlay image converter to perform various functions of shifting, inverting, rotating, and mirroring a picture image as displayed on a personal computer without increasing the load of the CPU, in real time, and with ease, by adding an image converter between the video controller and the image memory of the personal computer. The converter includes a video RAM for storing luminance and chrominance of the picture image; a video controller for storing data on the image memory or controlling the image memory to display data stored in the image memory after reading and outputting it; a converter which can change an image memory space with an address index data of the image memory between the video controller and the image memory; and a first bus transmitter for luminance data and chrominance data, which transmits synchronized image data, and is connected between the video controller and the image memory.

5 Claims, 5 Drawing Sheets

VIDEO OVERLAY IMAGE CONVERTER

BACKGROUND OF THE INVENTION (1) Field of the Invention

The present invention relates to a video overlay image converter. More particularly, this invention relates to adding a video overlay image converter to a video overlay board, mainly for processing video data to provide various effects.

(2) Description of the Prior Art

A video overlay board is employed mainly for processing image data. Video overlay cards take input of pixel data, synchronized signals, and clock signals, accept signals of NTSC (National Television System Committee), or PAL chrominance television VCR (Video Cassette Recorder), and LDP (Laser Disc Player), and display on a VGA monitor. They also have functions of amplifying, minimizing picture image and controlling the image of chrominance keying.

The memory conventionally used in a video overlay board is composed of six video RAM (Random Access Memory) chips having 256 KB*4 bits and processing speed capacity of 100 ns each, with two banks having a total capacity of 1 KB*512*12 bits. Therefore, one bank is composed of three video RAM chips.

This memory can be set as 1 MB within 16 MB which does not overlap with system memory. Two video RAMs are used for storing luminance data in each bank, while one video RAM is used for storing chrominance data. It is possible to store a suspended image on a disk by access to the CPU (Central Processing Unit) of the associated personal computer.

However, the conventional video overlay board is disadvantageous in that it increases the load of the CPU and it is difficult to reproduce the picture image in real time, in order to perform flipping of picture image vertically or horizontally, inverting or rotating the picture, and showing a mirror effect or certain chrominance values. That is why a series of functions of setting the area such as a system memory buffer area, copying the set image data and recopying the data to another area, conventionally must be performed in software.

SUMMARY OF THE INVENTION

The primary object of the present invention is to provide a video overlay image converter for performing various effects of shifting, inverting, rotating, and mirroring a picture image without increasing the load on the CPU of the associated personal computer, in real time, and with ease, by adding an image converter between a video controller and an image memory of a personal computer system having a data bus.

The present invention, to achieve the object, comprises:

an image memory for storing luminance and chrominance of a picture image;

a video controller for storing data in the image memory or controlling the image memory to display data stored in the image memory after reading and outputting that display data;

a converter which can change an image memory space with an address index data of the image memory between the video controller and the image memory; and a first bus transmitter for luminance data and chrominance data, transmits synchronized image data, this transmitter being connected between said video controller and said image memory.

The converter comprises:

a transmitting means, including a second bus transmitter which transmits memory addresses, this transmitter being connected between the video controller and the image memory, and a third bus transmitter enabling a user to exchange data between the image memory and the personal computer system by connecting the image memory and the system data bus directly; and an image RAM indexing unit, including a plurality of multiplexers and a plurality of memories to separately store a RAS (Row Address Strobe) address index and a CAS (Column Address Strobe) address index.

DETAILED DESCRIPTION OF THE PREFERRED EMBODIMENTS OF THE INVENTION

With reference to the drawings annexed hereto, hereinafter described is a preferred embodiment of the present invention.

Figure 1:
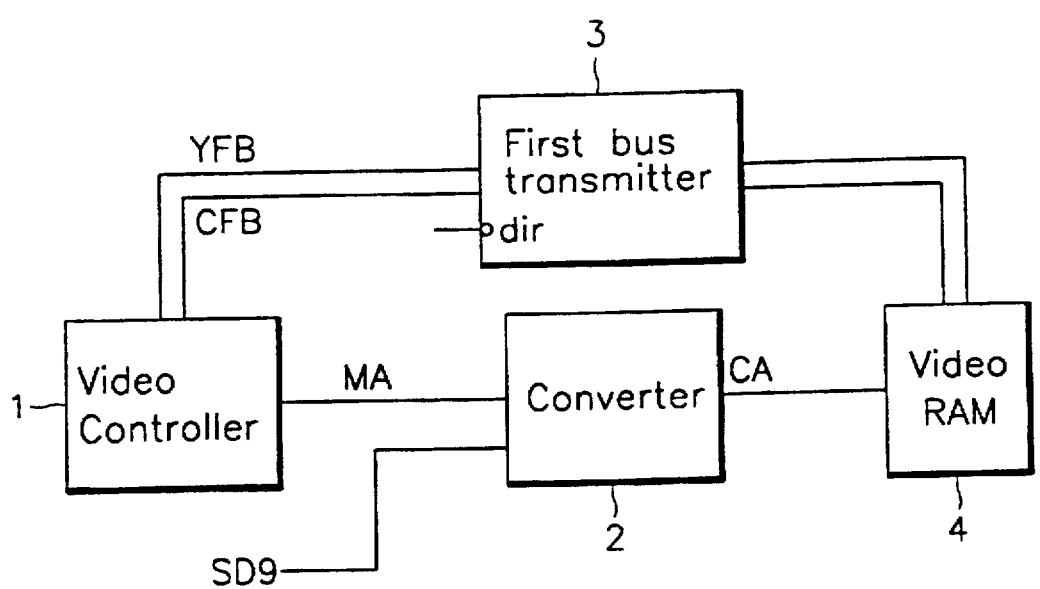
FIG. 1 is a block diagram of a video overlay image converter in accordance with a preferred embodiment of the invention.

As illustrated in FIG. 1, in accordance with a preferred embodiment, an image memory is formed by video RAM 4 and a video overlay image converter comprises:

a video controller 1, which, in case of storing image data on the video RAM 4 by controlling the video RAM 4 or displaying the data after reading it, provides a corresponding address of the image data MA to the converter 2 and is directly connected to the video RAM 4 for giving and taking video luminance data YAB and video chrominance data CFB through the first bus transmitter 3;

a converter 2, which performs the functions of outputting the corresponding address of image data MA inputted from the video controller 1 to the video RAM 4 in order to store an image data on the video RAM 4 by controlling the video RAM 4 or displaying the data after reading it, indexing data from the CPU to a static non-volatile RAM 23a, 23b input through the system data bus SD9 with the input/output address terminal port, and changing the video RAM 4 space with the index data in order to shift, invert, and rotate the video image;

an video RAM 4, which is connected to the video controller 1 to give and receive image luminance data YFB and image chrominance data CFB through the first bus transmitter 3, receives a converted address CA for performing functions of the video image through the converter 2, and makes it possible to display the corresponding image data; and a first bus transmitter 3 for luminance data YFB and chrominance data CFB, which transmits synchronized image data by connecting between the video controller 1 with the video RAM 4.

Figure 2:
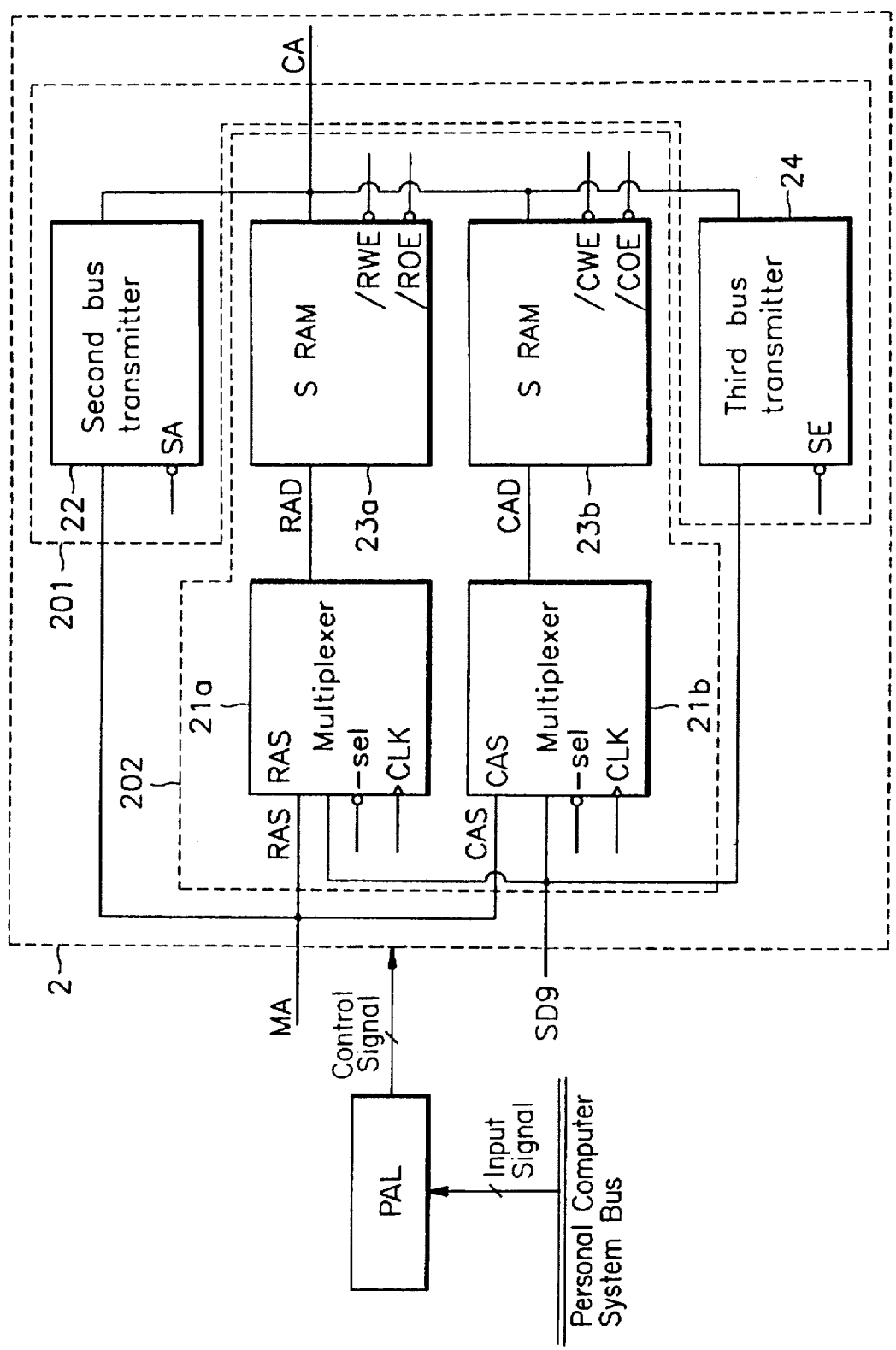
FIG. 2 is a detailed block diagram of the converter in a video overlay image converter in accordance with a preferred embodiment of the invention.

As illustrated in FIG. 2, the converter 2 in a video overlay image converter in accordance with a preferred embodiment of the invention includes a transmitting means 201 and a static non-volatile RAM indexing unit 202.

The transmitting means 201 includes a second bus transmitter 22, which transmits a synchronized address MA outputted from the video controller 1 to the video RAM 4, connected between the video controller 1 and the video RAM 4, processing of the image signal, and a third bus transmitter 24 for transmitting system data in case of image modification, shifting, inverting, and rotating, this transmitter being connected between the system data bus SE and a video RAM 4, thereby being capable of exchanging data between the system and the video RAM.

A static non-volatile RAM indexing unit 202 includes several multiplexers 21a, 21b for storing RAS and CAS address indexes and several static non-volatile RAMs 23a, 23b. In case of processing an image signal, after receiving a memory address MA outputted from the video controller 1, the static non-volatile RAM indexing unit 202 outputs the address CA to the video RAM 4, and activates each the control signals CVRAS, CVCAS, CVOE, CVWE of the video RAM 4. And, in case of image modification, shifting, inverting, or rotating the image, this unit receives the input of the system data from the system data bus SD9 and converts the position of data for the video RAM 4 by using the converter table and may modify the converter table easily.

Figure 3:
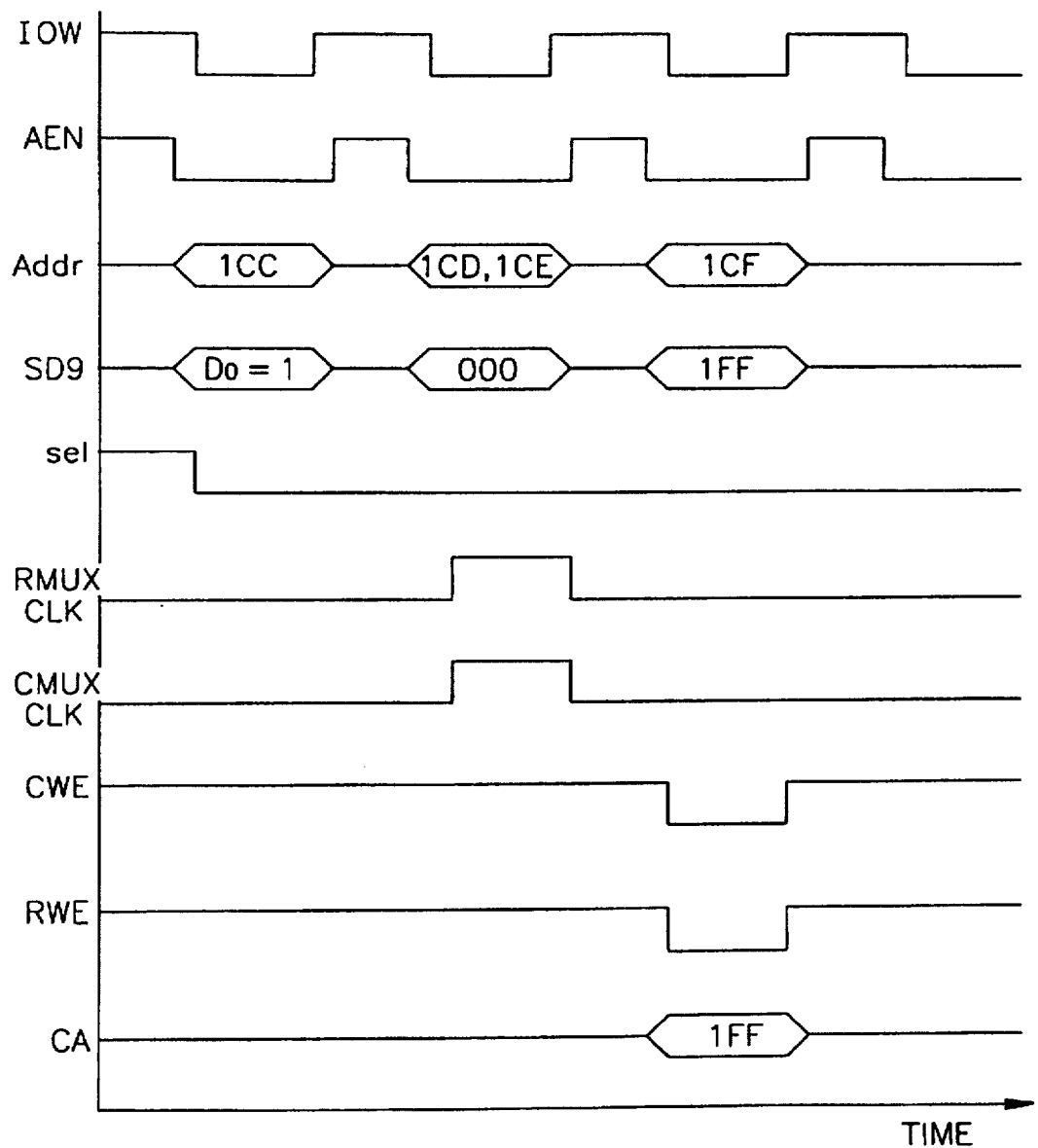
FIG. 3 is a time chart showing the process of indexing the addresses of the video RAM in a converter for the video overlay image, to the converter, in accordance with a preferred embodiment of the invention.

As illustrated in FIG. 3, the process of indexing the address of the video RAM in a video overlay image converter according to a preferred embodiment of the present invention is described below.

Once an IOW (Input/Output Writing signal) is at low level, a converter of video overlay image works. Then, if an AEN (Address Enable) signal is at a low level, an input/output terminal port for enabling or disabling the video controller 1 is fixed. For video image converting, a user sets an input/output terminal port 1CC, writes data, disables an MA output from the video controller, and latches the system data by enabling a sel, select instead.

To set the addresses RAS, CAS separately, the input/output terminal port 1CD is fixed, the RMUXCLK (RAS processing Multiplexer Clock) 21a is activated, and then the RAS address to be converted is latched from the system.

Once an input/output terminal port 1CE is set and CMUXCLK (CAS processing Multiplexer Clock) is converted into a high level and multiplexer 21b is activated, the address CAS to be converted is latched from the system.

After that, if the system enable signal SE decodes the input/output terminal port 1CF and writes the decoded data value to the static non-volatile RAM 23a, this process becomes an index of the video RAM 4 address enabling conversion of the address by using this index.

Figure 4:
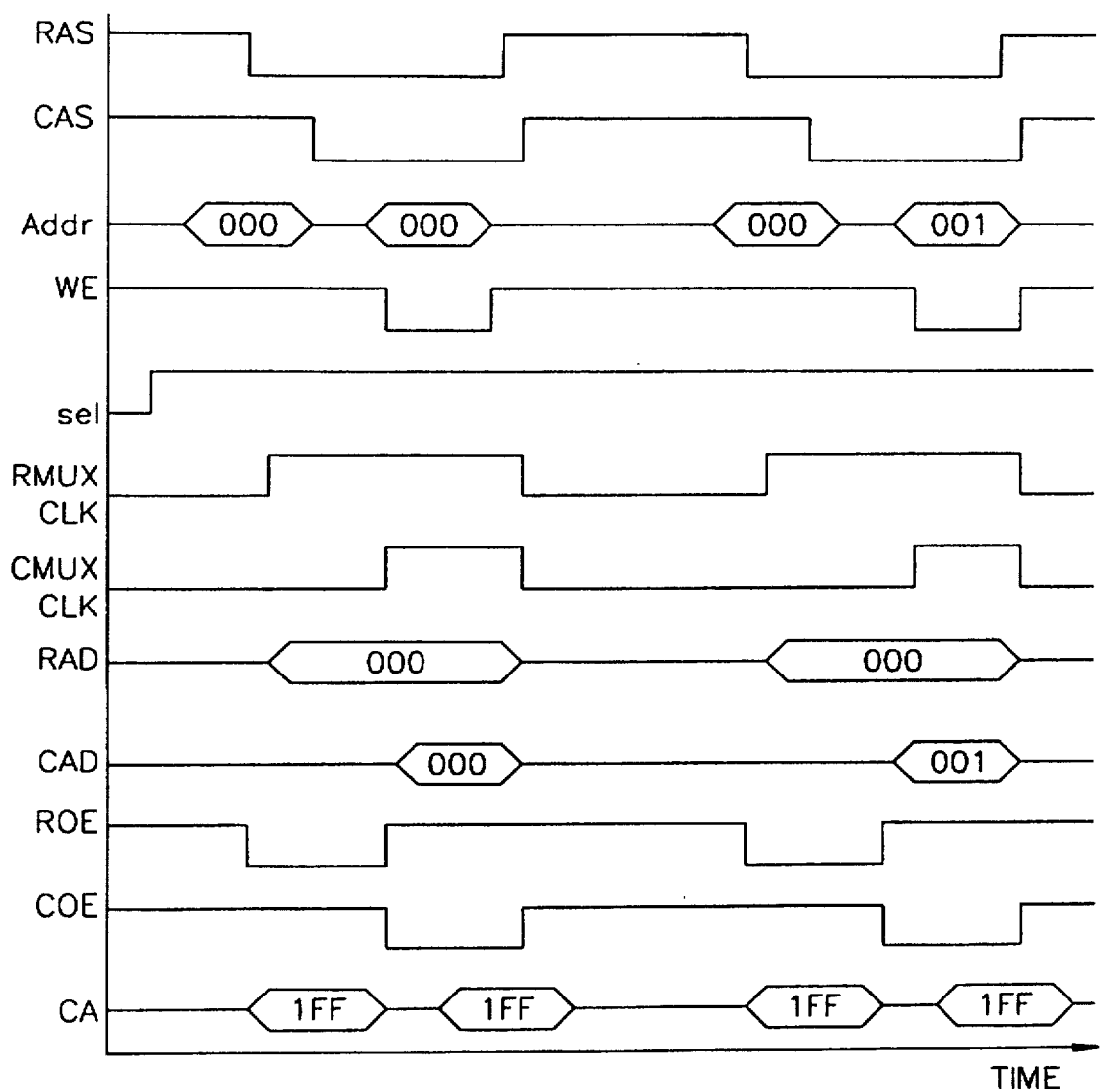
FIG. 4 is a time chart showing the control signals of the converter in displaying an image of a video RAM in a video overlay image converter in accordance with a preferred embodiment of the invention.

As illustrated in FIG. 4, the process for displaying the video image of the video RAM 4 of a converter of video overlay image in accordance with a preferred embodiment of the invention is described below:

In the converter 2, a user writes the data 0 in the input/output port 1CC by disabling the address MA output of the video RAM 4 from the video controller 1 by random setting, enables the address output MA of the video RAM 4 in the video controller, disables the sel of the multiplexers 21a and 21b which is enabled in the process of indexing, followed by converting a signal inputted to the multiplexer into the address MA of the video controller 1, and finally permitting the address of the video controller 1 to be provided, at a low level, as signals RAS, CAS.

As the signals RAS, CAS are inputted to the clock signals RMUXCLK, CMUXCLK of the multiplexers 21a, 21b, the multiplexers 21a, 21b for processing RAS and CAS each are converted into an enabled high level, and both of the multiplexers 21a, 21b are activated. Thereafter, the output signals RAD, CAD are provided to the static non-volatile RAMs 23a, 23b.

Figure 5:
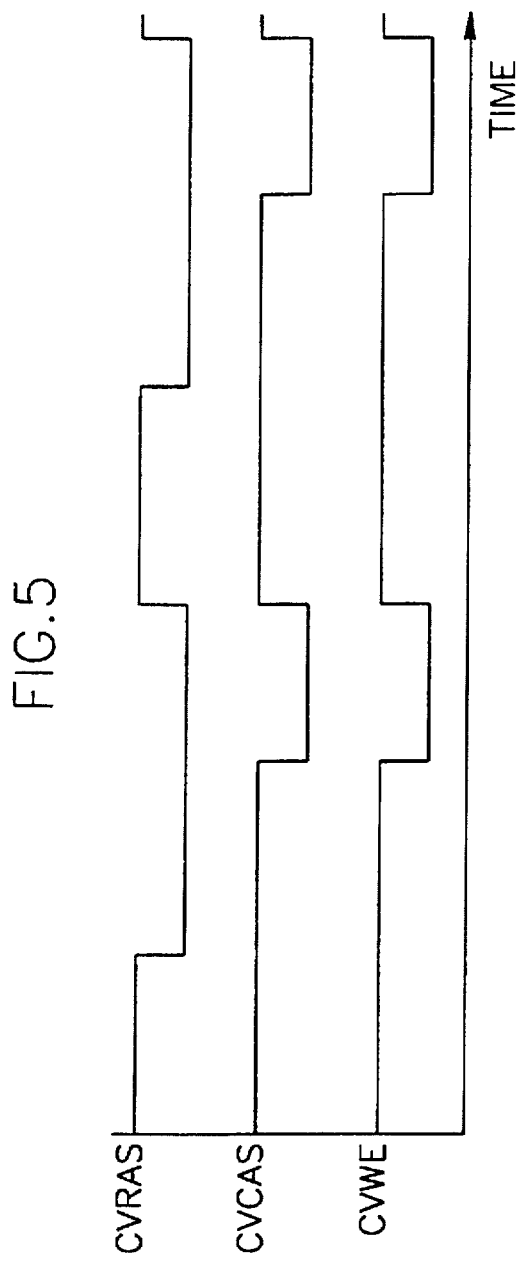
FIG. 5 is a time chart showing the control signals of the video RAM in displaying an image of a video RAM in the video overlay image converter in accordance with a preferred embodiment of the invention.

As illustrated in FIG. 5, once the signals RAD, CAD are inputted to the static non-volatile RAM 23a, 23b of the indexing unit 202, the enabling signals ROW, COW controlling the output of the static non-volatile RAM 23a, 23b become at a low level, and controlling signals CVRAS, CVCAS, CVWE are converted into a low level to enable the video RAM 4 to display variously converted images, by outputting the data stored in the static non-volatile RAM 23a, 23b to convert the address of the video RAM 4.

After constructing the circuit of the present invention, in storing the decoded data of 1CF port in the static non-volatile RAM 23a, 23b, the following programs can be used.

MOV AX, 01FF

MOV DX, 01CF

OUT DX, AX

In the above program, the value of 01FF, the decoded data in input/output port 1CF, can be varied in accordance with the setting of a user. Through this kind of routine, the data can be converted into an address providing a real-time image.

As shown in FIGS. 1 and 2, for a video overlay image converter according to a preferred embodiment of the invention and a converter 2 therein, controlling signals activating each terminal are needed. Connection among these controlling signals are constructed with a programmable logic array.

In TABLE 1, /A:1CE means the address value setting an input/output port. To set an input/output port 1CE for a user, an address-enabling signal must be at a low level, as well as an input/output enabling signal. That is, in a feasible state, an address marked as 10 bit in a binary digit system should indicate 1 CE in hexadecimal digit.

An RMUXCLK logical equation means that once one condition among three other conditions is satisfied, the clock signal activating the RAS processing multiplexer is inputted. And the RAS processing multiplexer 21a can function in a state that the clock signal is at a low level.

The /RWE signal is a controlling signal causing data to be written in the RAS processing multiplexer. The /RWE signal permits writing the data into the RAS multiplexer 21a, only when the three conditions, that the low level state is activated, 1CF port is set through an address bus, simultaneously an input/output enabling signal is at a low level, and the RAS processing clock signal is inputted at a high level, are satisfied conjunctively.

This invention therefore provides a video overlay image converter for performing various effects of shifting, inverting, rotating, or mirroring the picture image without increasing the load of the CPU, in real time, and with ease, by adding an image converter between a video controller and an image memory of a personal computer.

TABLE 1

```
                "* /" denotes a low level
output signal          connection of input signals
/A:1CC=/AEN*/IOW*/A9*A8*A7*A6*/A5*/A4*A3*A2*/A1*/A0
/A:1CD=/AEN*/IOW*/A9*A8*A7*A6*/A5*/A4*A3*A2*/A1*A0
/A:1CE=/AEN*/IOW*/A9*A8*A7*A6*/A5*/A4*A3*A2*A1*/A0
/A:1CF=/AEN*/IOW*/A9*A8*A7*A6*/A5*/A4*A3*A2*A1*A0
/SA =/Dir*/RAS
/sel =/AEN*/A:1CC*/SDO:1+/sel*dis
/dis =/AEN*/A:1CC*/IOW*/SDO:0
RMUXCLK =/A:1CD(/IOW+RMUXCLK*A:1CF*RAS+/RAS*dir
/AEN*/A:1CD*/IOR
CMUXCLK=/AEN*/A:1CE*/IOW+CMUXCLK*A:1CF*RAS+/CAS*dir
/AEN*/A:1CE*/IOR
/SE =/AEN*/A:1CF*/IOW+/AEN*/A:1CF*/IOR
/RWE =/A:1CF*/IOW*CMUXCLK
/ROE =/A:1CF*/IOW*CMUXCLK+/RAS*CAS*dir
/SE =/A:1CF*/IOW*CMUXCLK+/RAS*/CAS*SA
/CVRAS =/RWE+/ROE
/CVCAS =/CWE+/COE
/CVOE =/RWE+/CWE
/CVWE =/ROE+/COE
```

What is claimed is:

1. A video overlay image processor, comprising:

a video controller for storing data in an image memory or controlling image memory in a personal computer system having a system data bus by reading and displaying data stored in the image memory;

a converter which can change image memory space with address index data of the image memory between the video controller and the image memory;

a first bus transmitter for luminance data and chrominance data which transmits synchronized image data, said first bus transmitter being connected between said video controller and said image memory; and wherein said converter is comprised of:

a transmitting means including a second bus transmitter which transmits a memory address by connecting said video controller with said image memory, and a third bus transmitter which enables exchange of data between said image memory and said system by directly connecting said system data bus with said image memory; and an image RAM index unit including a plurality of multiplexers and a plurality of memories to separately store a row address strobe address index and a column address strobe address.

2. A video overlay image processor as defined in claim 1, wherein said converter further comprises a plurality of memories using static non-volatile RAM.

3. A video overlay image processor as defined in claim 1, wherein:

said image memory is a video RAM.

4. A video overlay image processor as defined in claim 1, wherein:

said converter changes said image memory space with said address index data in order to shift, invert, rotate or mirror said video image.

5. A video overlay image processor, comprising:

a video controller for storing data in an image memory or controlling image memory in a personal computer system having a system data bus by reading and displaying data stored in the image memory;

a converter which can change image memory space with address index data of the image memory between the video controller and the image memory; and a first bus transmitter for luminance data and chrominance data which transmits synchronized image data, said first bus transmitter being connected between said video controller and said image memory, wherein the controlling signals of each element comprising said first bus transmitter and said converter are comprised of a programmable array logic which has the functions of:

TABLE 1

```
output signal          connection of input signal
/A:1CC=/AEN*/IOW*/A9*A8*A7*A6*/A5*/A4*A3*A2*/A1*/A0
/A:1CD=/AEN*/IOW*/A9*A8*A7*A6*/A5*/A4*A3*A2*/A1*A0
/A:1CE=/AEN*/IOW*/A9*A8*A7*A6*/A5*/A4*A3*A2*A1*/A0
/A:1CF=/AEN*/IOW*/A9*A8*A7*A6*/A5*/A4*A3*A2*A1*A0
/SA =/Dir*/RAS
/sel =/AEN*/A:1CC*/SDO:1+/sel*dis
/dis =/AEN*/A:1CC*/IOW*/SDO:0
RMUXCLK =/A:1CD(/IOW+RMUXCLK*A:1CF*RAS+/RAS*dir
/AEN*/A:1CD*/IOR
CMUXCLK=/AEN*/A:1CE*/IOW+CMUXCLK*A:1CF*RAS+/CAS*dir
/AEN*/A:1CE*/IOR
/SE =/AEN*/A:1CF*/IOW+/AEN*/A:1CF*/IOR
/RWE =/A:1CF*/IOW*CMUXCLK
/ROE =/A:1CF*/IOW*CMUXCLK+/RAS*CAS*dir
/SE =/A:1CF*/IOW*CMUXCLK+/RAS*/CAS*SA
/CVRAS =/RWE+/ROE
/CVCAS =/CWE+/COE
/CVOE =/RWE+/CWE
/CVWE =/ROE+/COE
``` where, AEN denotes address enable, IOW input/output writing signal, SA select address, sel select, dis disable, DIR director, RAS row address strobe, CAS column address strobe, RMUXCLK RAS processing multiplexer clock, CMUXCLK CAS processing multiplexer clock, SE select enable, RWE row write enable, ROE row output enable, CVRAS control video row address strobe, CVCAS control video column address strobe, CWE column write enable, COE column output enable, CVOE control video output enable, CVWE control video write enable.

* * * * *